July 18, 1961
A. H. BROWN
2,992,590
METHOD FOR SIMULTANEOUSLY PHOTOGRAPHING PICTURES AND RECORDING SOUND
Filed Dec. 24, 1958
2 Sheets-Sheet 1
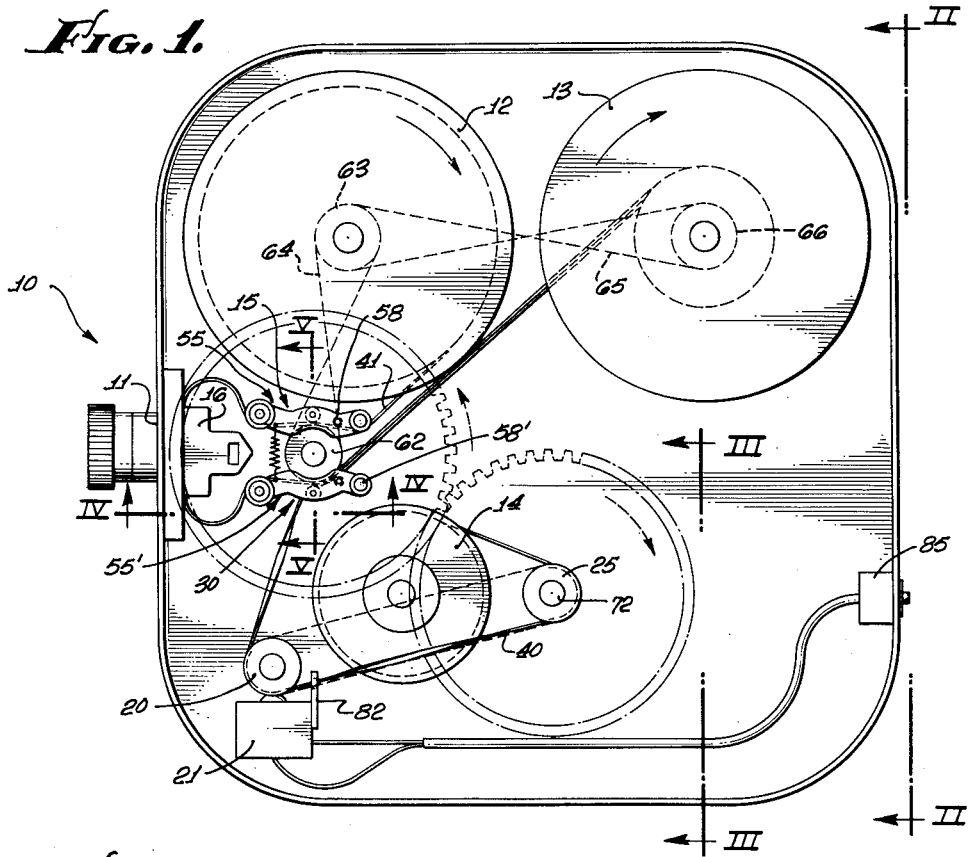
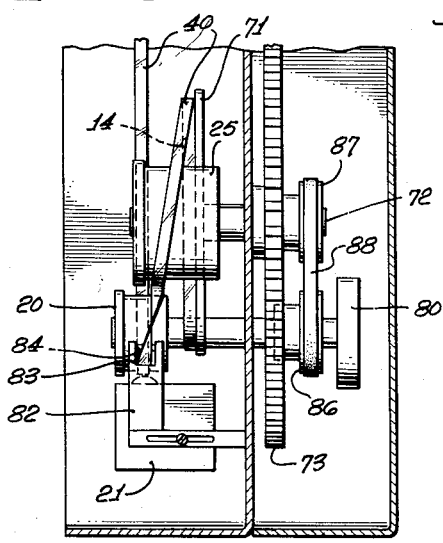
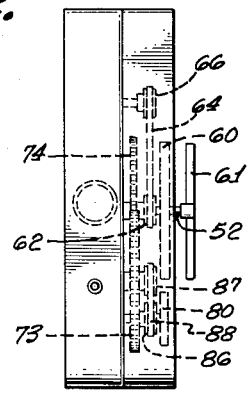
INVENTOR.
ARTHUR H. BROWN
BY
ATTORNEYS.

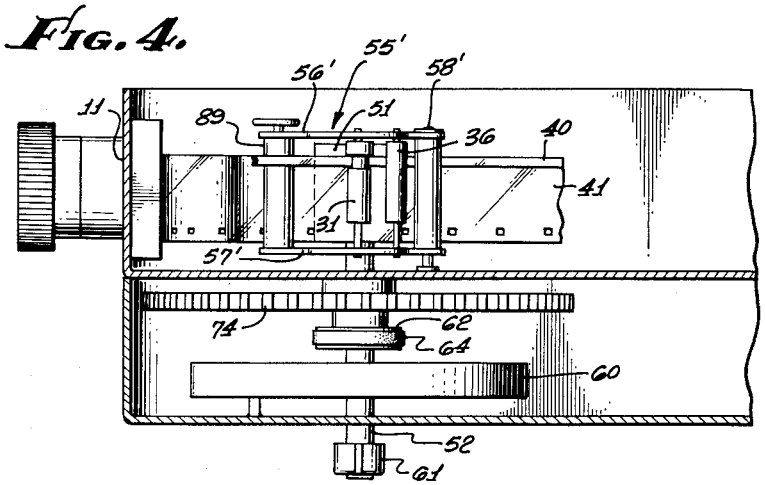
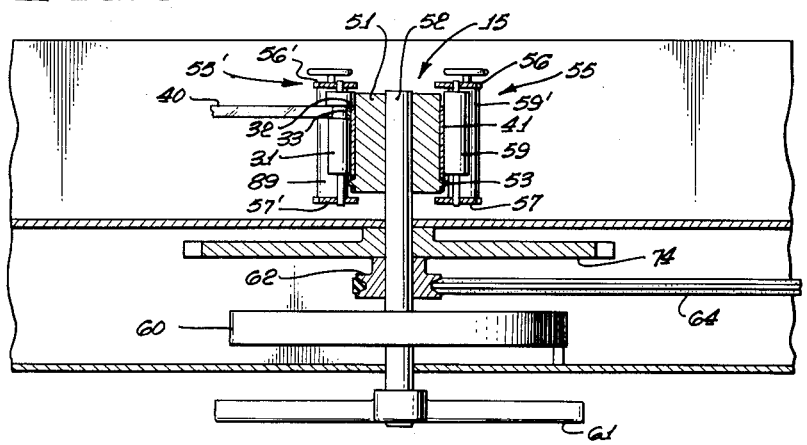
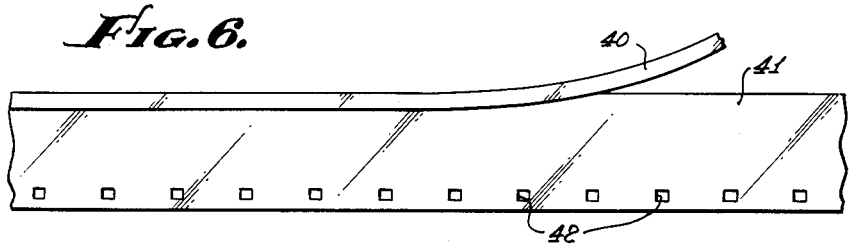

United States Patent Office 2,992,590
Patented July 18, 1961

2,992,590
METHOD FOR SIMULTANEOUSLY PHOTOGRAPHING PICTURES AND RECORDING SOUND
Arthur H. Brown, 212 14th St., Seal Beach, Calif.
Filed Dec. 24, 1958, Ser. No. 782,903
5 Claims. (Cl. 88—16.2)

This invention relates to a method of and apparatus for simultaneously photographing pictures and recording sound to form a composite motion picture-sound film, by the use of a separate strip of novel magnetic tape having a pressure sensitive adhesive backing. Such a composite film can be readily and simply made by the use of a single, compact camera capable of being operated by an amateur or otherwise inexperienced user.

Heretofore, devices which record sound in synchronization with pictures on a film rely on a pre-attached sound-recording strip such as a portion of the emulsion layer carried by the film. Since the picture film travel must be intermittent at the exposure aperture and constant at the recording head, these devices necessarily record the sound at a point displaced longitudinally with respect to the matching picture, generally a distance of twenty-eight frames. In attempting to edit and cut this type of film, many problems are encountered. To cut and splice the pictures on the film would interfere with the sound twenty-eight frames ahead and deleting unwanted picture footage results in losing needed sound footage. It can therefore be seen that this type of system can be used only for long unedited shootings or requires "dubbing," the production of rerecordings, and both negative and positive additional prints before a finished negative or print is obtained.

In substitute for the system where an original film having the pre-attached sound strip is used, a double system has been employed in which an entirely separate sound track is obtained in separate sound recording equipment in synchronization with the picture film. The picture film and sound track are separately developed, edited and cut and then advanced in synchronization with each other to be photographed onto a release film. It should be noted that in this system the sound is photographed onto the release film. This double system is primarily used in the professional motion picture industry and involves great cost, expensive synchronizing equipment, time and skilled personnel. Therefore, up to the present time there is no system or device available for the amateur or home user to inexpensively take motion pictures and simultaneously and in synchronization therewith record sound, the sound and picture being in cutter's synchronization, i.e., the sound is in alignment with its corresponding picture and the composite film can be cut at any desired place without loss.

The present invention provides a method and apparatus which now will permit an amateur to simultaneously record sound in synchronization with the photographing of pictures. One standard motion picture film is utilized instead of two as used in the double system. The sound is recorded in synchronization with the taking of the pictures on a separate unattached magnetic tape having a pressure sensitive adhesive backing. The unexposed photographic film is continuously advanced toward an exposure zone while the separate strip of magnetic tape is continuously fed toward a recording zone. The photographic film is intermittently advanced at the exposure zone and the magnetic tape is continuously being recorded on at the recording zone. The exposed photographic film and recorded tape are then continously moved toward a securing zone where the tape is adhesively secured to an edge portion of the exposed photographic film. The securing zone is equidistant in film and tape length from the exposure zone and recording zone. Therefore, the recorded tape is secured to the film with any portion of the sound recording on the tape adjacent its matching or corresponding picture. This condition is known as cutter's synchronization and will be so referred to as such hereinafter.

After the film is developed, it is possible to edit and cut the composite film having the picture and sound in synchronization, without mismatching the sound and picture. An amateur can easily perform this job and the cost of expensive synchronizing equipment and skilled personnel is eliminated.

An object of the present invention is the provision of a novel and simplified method and apparatus for simultaneously photographing pictures and recording sound to form a composite original motion picture-sound film.

Another object is to provide a method and apparatus for making motion picture-sound films by an amateur or relatively unskilled personnel.

A further object of the invention is the provision of a single camera which can simultaneously take pictures and record sound to produce a composite picture-sound film.

Another object is to provide composite motion picture-sound film having a magnetic strip of tape detachably secured on one edge thereof.

An object is to provide a flexible, narrow strip of magnetic tape adapted to have audible sound recorded thereon and adapted to be wound on a reel and detachable secured to an exposed photographic film in cutter's synchronization.

Still another object is the provision of a method and apparatus for making composite motion picture-sound films which are less expensive, simpler to use and faster than comparable methods and apparatus used heretofore.

Other objects and advantages of this invention will be readily apparent from the following description of the drawings:

In the drawings:

FIG. 1 shows a side elevational view (cover removed) of the inside of a camera illustrative of the type that can be used to practice the method of the present invention.

FIG. 2 is an end view of the camera taken along plane II—II of FIG. 1.

FIG. 3 shows a transverse section of the camera taken along plane III—III of FIG. 1.

FIG. 4 is a transverse section of the camera taken along plane IV—IV of FIG. 1.

FIG. 5 shows a transverse section of the camera taken along plane V—V of FIG. 1.

FIG. 6 is a plan view of the composite motion picture sound film of the present invention, one end of the magnetic tape being detached from the photographic film.

In FIG. 1 a camera 10 is illustrated for simultaneously photographing pictures and recording sound to from a composite motion picture sound film in a unitary apparatus having standard front, rear and side walls and an exposure aperture and gate 11 in the front wall. Within the camera a film supply reel 12, a film take-up reel 13 and a separate supply reel 14 for magnetic tape may be rotatably mounted on one side wall. A driven, controllable, uniform speed film feed means 15 may be rotatably mounted within the camera for continuously advancing unexposed film from the film supply reel 12 toward an exposure zone containing the exposure aperture 11 and for moving exposed film toward the take-up reel 13. Any suitable and well known means 16 may be provided for intermittently moving photographic film past the exposure aperture 11 in timed relation to the film feed means 15. Since the present method is particularly adapted to amateur motion picture use, the camera illustrated is of a type adapted to handle 16 mm. film having a single row of perforations adjacent one longitudinal edge.

The camera may be provided with a recording zone having a nonconductive, nonmagnetic, sprocketless recording drum 20 and a magnetic sound recording head 21 adjacent the drum 20 for recording sound on magnetic tape as it passes around the drum 20. Suitable magnetic tape tension and feed means 25 may be provided for continuously feeding a separate flexible and narrow strip of magnetic tape 40 from the tape supply reel 14 toward the sound-recording zone as the film is intermittently advanced at the exposure zone and the magnetic tape is simultaneously and continuously being recorded on at the recording zone. The exposed photographic film and the recorded tape are continuously moved to a securing zone 30 at a constant speed where the tape is adhesively secured to an edge area portion of the film in cutter's synchronization (FIG. 4). This is obtained as a result of the securing zone 30 being equidistant in film and tape length from the exposure aperture 11 and the sound recording head 21, and the constant speed of the tape and film when the tape is being secured onto the film. Within the securing zone 30 a tape guiding and securing means 31 may be provided adjacent the film feed means 15 for receiving the magnetic tape from the recording drum 20 and adhesively securing the tape onto an edge portion of the exposed film.

The sound-recording tape 40 which may be used in producing the magnetic sound recordings for synchronization with photographic motion picture film 41 may be composed of a flexible thin organic plastic tape provided with a magnetic metal coating secured on one side thereof, the coating being adapted to record and reproduce audible sound. A layer of pressure sensitive adhesive is carried by the other side of the tape 40 for detachably securing the tape onto a marginal portion of the film 41. While various types of pressure sensitive adhesives may be used, one suitable adhesive is known as Minnesota Mining and Manufacturing Co. No. 466 (available in roll form). A coating of readily removable, nonmagnetic, nonadhesive parting and separating material is preferably carried on the surface of the magnetic metal coating whereby the tape may be wound upon reel 14, with the adhesive side out, to form a plurality of layers and readily rewound from the reel without adhesion of the pressure sensitive adhesive to the magnetic metal coating. Such parting material may be sprayed, fogged or brushed upon the magnetic coating (or upon the surface of the adhesive) in an extremely thin, substantially invisible layer; silicones and silicone compositions (which may include stearates or antifoam agents) have been found satisfactory. It has been found that a tape 40 composed of a polyester material made from polyethelene and terephthalate and known as "Mylar" is desirable. For use with 16 mm. picture film, a magnetic tape having a width of .083 inch and a thickness of .0015 inch gives good results.

The photographic film 41 used in the camera may be of any standard size such as 16 mm. (35 mm. and 8 mm. are not excluded) and has a longitudinally extending series of perforations 42 for engagement with the sprocket teeth which are provided on the film feed means 15. The film 41 is adapted to carry a series of optically recorded images in sequence after passing through the exposure aperture 11 and the narrow magnetic sound tape 40 along a longitudinally extending area portion in cutter's synchronization with the images.

The uniform speed film feed means 15 may have a sprocket drum 51 keyed to a shaft 52 extending through and journalled in the side wall of the camera. The sprocket 51 is provided with sprocket teeth or lugs 53 around the periphery of one end thereof. The sprocket teeth 53 are adapted to drivingly engage the apertures 42 provided in the film 41. An upper film roller cage member 55 may rotatably support film rollers for guiding the film from the supply reel 12 and forcing it into driving contact with the sprocket 51. The cage 55 may comprise spaced bracket arms 56 and 57 which are connected together and pivoted about an axis passing through a pin 58. The cage 55 may have a rotatable film guide roller 59 for guiding the film onto the sprocket 51 and a rotatable rear tension roller 59' for tensioning and guiding the tape 41 as it passes from the sprocket 51 toward the exposure aperture 11. Due to the intermittent motion required at the exposure aperture, the film 41 is threaded through the means for intermittently moving the film 16 with a slack loop on either side thereof, this being the common practice in motion picture cameras. Cage 55 is preferably spring biased toward sprocket drum 51.

The sprocket 51 may be driven by any suitable controllable means such as spring motor 60 which is suitably connected to the shaft 52 and is adapted to be rewound by a turn key 61 protruding from one side of the camera. Any customary drive mechanism adapted to move the film at a desired speed, to expose the desired number of frames per second may be used. The sprocket 51 and the film supply reel 12 are rotated in opposite directions and means for accomplishing this result may be pulleys 62 and 63 mounted on the shafts which are keyed to the sprocket 51 and the supply reel 12 respectively. A pulley belt 64 may be wound around the pulleys 62 and 63 in a criss-cross manner to provide opposite rotation for the sprocket and the supply reel. In order for the take-up reel 13 to provide the proper tension on the exposed composite photographic film and recorded tape, the reel 13 is rotatably driven in the opposite direction from the supply reel 12 by a criss-cross pulley belt 65 extending from the pulley 63 to a pulley 66 which is keyed to the shaft which rotatably mounts the take-up reel 13. The pulley belt 65 may be of the coiled spring type which will allow for slippage as the film is pulled off of the supply reel 12 and is wound on take-up reel 13.

The magnetic tape supply reel 14 may be provided with a radially extending flange 71 (FIG. 3) for directing the tape 40 towards a snubber's tension and feed drum 25 which serves as a feed means for continuously feeding the separate narrow, flexible strip of magnetic tape 40 toward the recording zone. The tension and feed drum 25, as best seen in FIG. 3, is carried by a shaft 72 extending through a partition wall of the camera, shaft 72 being fixed to a driven gear 73. The driven gear 73 meshes with a driving gear 74 which is connected to the sprocket shaft 52. The gears 73 and 74 are of equal diameter to cause the tape feed drum 25 to be rotated at the same speed as the sprocket film feed means 51. The magnetic tape 40 is twisted one-half of a turn or through 180 degrees between drum or roll 25 and where it passes between the recording drum 20 and the sound recording head 21. The magnetic-adhesive tape is preferably carried with adhesive side uppermost (outwardly facing) on feed reel 14. By twisting the tape 40 one-half of a turn, the adhesive side of the tape is placed in contact with the surface of the drum 20 to ensure uniform movement of the tape while recording. The outer surface of side or flange 71 of supply reel 14 assists in guiding and twisting the tape into its laterally offset, reversed position on the recording drum 20. To aid the uniform movement of the tape, a speed stabilizing means 80 may be connected to the drum 20, one suitable stabilizing means being a fly wheel. A tape guiding and positioning means 82 may be adjacent the recording drum for receiving tape from the separate tape supply reel 14 and centering the tape on the recording drum 40. The means 82 may have two spaced arms providing an opening 83 of a width slightly greater than the width of the magnetic tape and a transverse roller 84 rotatably mounted between the arms for guiding the tape 40. The sound-recording head 21 is of a usual type well known to those skilled in the art. An electrical socket 85 may be secured to one of the walls of the camera and electrically connected to the sound-recording head 21 by suitable electrical conductors.

It is desirable that the sound-recording drum 20 be rotated at the same speed as the feed drum 25. To accomplish this result, the shafts of each of the drums 20 and 25 may be provided with suitable pulleys 86 and 87, respectively, of the same size and a belt 88 may interconnect the pulleys 86 and 87.

When the magnetic tape 40 is being threaded, upon leaving the sound-recording drum 20, the tape is again twisted one-half of a turn to position the adhesive side of the tape on the outside and in position for engaging the marginal edge of the photographic film 41. The tape 40 and film 41 are continuously moved to the securing zone 30 where an upwardly biased lower roller cage member 55' may be pivotally supported about a pin 58' secured to the side wall of the camera. The lower cage member 55' may comprise spaced bracket arms 56' and 57' for rotatably mounting a plurality of rollers for guiding and maintaining the tape and film in contact with the sprocket 51. Upon leaving the intermittent motion means 16 and exposure gate, film 41 passes over a tension roller 89 which is rotatably mounted between the arms 56' and 57'. Tape 40 is received in the tape guiding and securing means 31 which is adjacent the sprocket 51 for pressing the tape onto the unperforated edge portion of the exposed film 41.

The tape guiding and securing means may be a roller 31 rotatably mounted between the arms 56' and 57'. The roller 31 may be provided with an outwardly extending radial tape-guiding portion 32 for guiding the tape 40 along the edge of the exposed photographic film 41. Immediately adjacent the radial guiding edge portion 32 is provided a tape-receiving groove 33 having a width and depth approximately equal to the width and thickness of the magnetic tape 40. It can thus be seen that as the exposed photographic film 41 leaves the roller 89 and passes around the sprocket 51, the magnetic tape 40 is received within the groove 33 and is adhesively secured and positioned onto the edge portion of the exposed film 41.

Since the tape guiding and securing roller 31 is equidistant in film and tape length from the exposure aperture 11 and the sound-receiving head 20, respectively, the recorded magnetic tape 40 will be secured to the exposed photographic film 41 in cutter's synchronization while the tape and film are moving at a constant speed. Since the distance between the securing roller 31 and sound recording head 20 is fixed and the tape is under tension, the amount of slack in the exposed picture film between the roller 31 and aperture 11 is controlled and may vary to allow the recorded tape to be attached thereto in varying synchronizations, i.e. cutter's, printer's, etcetera. A tension roller 36 may also be rotatably mounted between the arms 56' and 57' for tensioning the composite film and tape as it passes from between the roller 31 and the sprocket 51. The composite film and tape is then wound upon the take-up reel 13 without any slack being provided therein due to the driving connection between the take-up reel 13 and the film supply reel 12.

It is also preferred that the camera 10 illustrated in the drawings be divided into two compartments, one compartment housing the reels, sprocket, sound-recording drum, sound-recording head, etc., and the other compartment being used to house the gears, pulleys and belts and other means used to drive the reels, drums and sprocket during the operation of the camera. It should be understood that the means described for connecting and driving the elements in the camera are only exemplary, as other well known means could be used. The exposure aperture 11 may be provided with any suitable type of housing and lens which are well known to those skilled in the art.

It should be understood that the electrical socket 85 may be utilized with a home magnetic tape-recording machine whose microphone, audio and bias circuits may be used for energizing head 21 and recording sound on tape in the camera. This is of particular advantage when the camera is being used by an amateur.

Any desired type of black and white or color film may be used in the above camera and the entire operation of photographing carried out in the customary manner, suitable microphone and audio equipment being electrically connected to head 21. It is to be noted that the camera is extremely compact and light in weight; it need not be much larger than usual 16 mm. portable cameras now on the market for amateur use. The film, after exposure, carries the sound track attached thereto in cutter's or dead synchronization; after being developed it can be readily edited and cut, a pair of simple transverse cuts, removing both pictures and their correlated sound. It is not necessary to use a complex and expensive moviola for editing; instead, a prism type edition (where pictures can be viewed from a constantly moving film) may be used by placing a sound pick-up head over the mid point of the editor, thereby getting both sound and picture.

The adhesively secured magnetic tape permits great flexibility in handling. For example, after cutting, editing and splicing a developed, reversal type picture film obtained as hereinabove described, the cut and edited film may be placed on a film supply reel 12 in an inside-out, backward manner, the sound picked up from the original magnetic tape carried on the film and recorded on a new strip of magnetic tape which is now adhesively secured to the other side of the picture film in desired longitudinally offset relation (of 14 to 28 frames as required by the magnetic pick-up picture projector to be eventually used). The original magnetic tape recording can then be removed by peeling it off the film. The picture film, now in edited form, carries an unbroken, continuous magnetic sound record in desired, finished, longitudinally displaced printer's synchronization, and only one dubbing or re-recording was necessary.

In another method of handling the composite film-sound tape obtained by my method, the composite film may be cut, edited, spliced and the pictures printed upon a final projection print film. During such printing the sound from the magnetic tape may be picked up and re-recorded optically upon an edge portion of the photographic emulsion in desired longitudinally offset relation (to obtain a final print with sound in suitable synchronization for pick up by an optical variable area of variable density system) or the sound from the original magnetic tape on the negative may be picked up and recorded upon a fresh magnetic tape which is then attached (during such printing) upon the release print.

Moreover, the use of a magnetic tape having a pressure adhesive which permits such tape to be readily attached to an edge area of a continuous picture film greatly facilitates the addition of sound to picture films taken without concurrent sound recording. Musical backgrounds and commentaries may be readily added to previously taken picture films without the necessity of getting new prints and without the loss in definition which characterizes secondary prints.

Obviously many modifications and variations of the present invention are possible in the light of the above teachings. It is therefore to be understood that within the scope of the appended claims, the invention may be practiced otherwise than as specifically described.

I claim:

1. The method of simultaneously photographing pictures and recording sound in unitary apparatus to form a composite motion picture sound film comprising the steps of: continuously advancing unexposed photographic film from a supply toward an exposure zone; continuously feeding from a separate supply a separate narrow strip of magnetic tape having a pressure sensitive adhesive backing toward a sound recording and tape stabilizing means in a recording zone, said tape having been previously unsecured to said film, the adhesive backing contacting the stabilizer means to ensure uniform movement of the tape while recording; intermittently advancing the photographic film at said exposure zone and simultaneously and continuously recording upon the magnetic tape at the recording zone; continuously moving said exposed photographic film and recorded tape to a securing zone; adhesively securing the magnetic recorded tape for the first instance to an edge portion of said exposed photographic film at said securing zone; and winding the composite film and tape upon a take-up reel.

2. The method of simultaneously photographing pictures and recording sound in unitary apparatus to form a composite motion picture sound film with a sound recording, comprising the steps of: continuously advancing unexposed photographic film from a supply toward an exposure zone; continuously feeding from a supply a separate narrow strip of magnetic tape having a pressure sensitive adhesive backing toward a recording zone, said tape having been previously unsecured to said film; intermittently advancing the photographic film at said exposure zone and simultaneously and continuously recording upon the magnetic tape at the recording zone; continuously moving said exposed photographic film and recorded tape to a securing zone; and adhesively securing the magnetic recorded tape for the first instance to an edge portion of said exposed photographic film at said securing zone.

3. The method of simultaneously photographing pictures and recording sound in unitary apparatus to form a composite motion picture sound film with a sound recording, comprising the steps of: continuously advancing unexposed photographic film toward an exposure zone; continuously feeding a separate narrow strip of magnetic tape toward a recording zone, said tape having been previously unsecured to said film; intermittently advancing the photographic film at said exposure zone and simultaneously and continuously recording upon the magnetic tape at the recording zone; continuously moving said exposed photographic film and recorded tape to a securing zone; securing the magnetic recorded tape for the first instance to an edge portion of said exposed photographic film and said securing zone; and winding the composite film and tape upon a take-up reel.

4. The method of simultaneously photographing pictures and recording sound in unitary apparatus to form a composite motion picture sound film with a sound recording, comprising the steps of: intermittently exposing photographic film at an exposure zone and simultaneously and continuously recording upon a separate narrow strip of magnetic tape having a pressure-sensitive adhesive backing at a sound recording zone, said tape having been previously unsecured to said film; continuously moving said exposed photographic film and recorded tape to a securing zone; and adhesively securing the magnetic recorded tape for the first instance to an edge portion of said exposed photographic film at said securing zone.

5. The method of simultaneously photographing pictures and recording sound in unitary apparatus to form a composite motion picture sound film with a sound recording, comprising the steps of: intermittently exposing photographic film at an exposure zone and simultaneously and continuously recording upon a separate narrow strip of magnetic tape at a sound recording zone, said tape having been previously unsecured to said film; continuously moving said exposed photographic film and recorded tape to a securing zone; and securing the magnetic recorded tape for the first instance to an edge portion of said exposed photographic film at said securing zone.

References Cited in the file of this patent

UNITED STATES PATENTS

| | | |
|---|---|---|
| 1,829,912 | Shearer | Nov. 3, 1931 |
| 1,924,110 | Dessau | Aug. 29, 1933 |
| 1,941,980 | Fleischer | Jan. 2, 1934 |
| 2,144,738 | Musumeci | Jan. 24, 1939 |
| 2,297,603 | Back | Sept. 29, 1942 |
| 2,479,868 | Rossmann et al. | Aug. 23, 1949 |
| 2,479,869 | Rossmann et al. | Aug. 23, 1949 |
| 2,480,162 | Rath | Aug. 30, 1949 |
| 2,643,130 | Kornei | June 23, 1953 |
| 2,657,932 | Blaney | Nov. 3, 1953 |
| 2,781,688 | Camras | Feb. 19, 1957 |
| 2,782,043 | Andrews | Feb. 19, 1957 |